A. MAYESKY & H. BOILEAU.
SHOCK DEADENER.
APPLICATION FILED MAR. 30, 1908.
943,119.                    Patented Dec. 14, 1909.
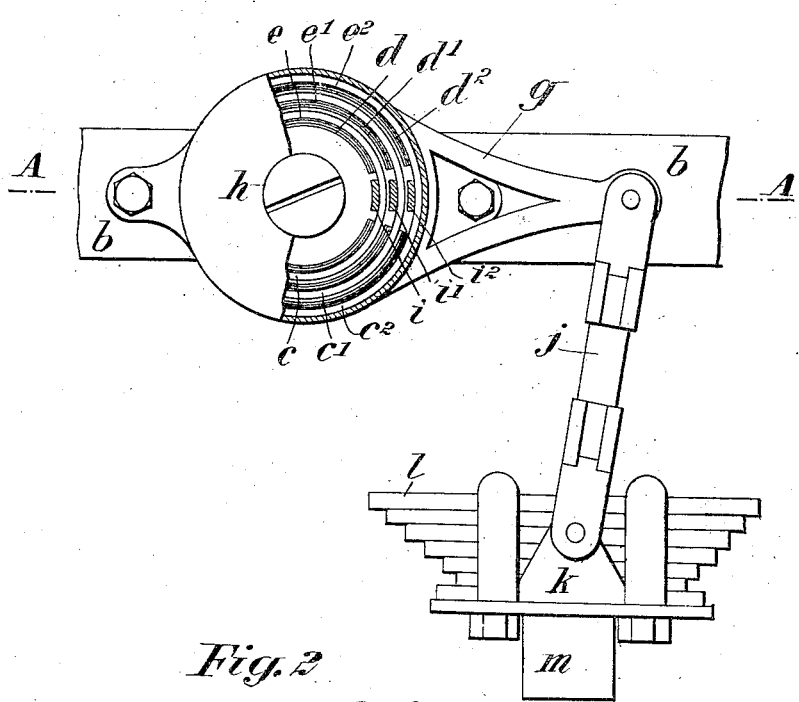
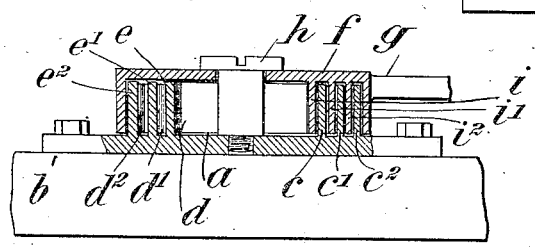

UNITED STATES PATENT OFFICE.

ALEXANDRE MAYESKY AND HIPPOLYTE BOILEAU, OF PARIS, FRANCE.

SHOCK-DEADENER.

943,119.

Specification of Letters Patent. Patented Dec. 14, 1909.

Application filed March 30, 1908. Serial No. 424,136.

*To all whom it may concern:*

Be it known that we, ALEXANDRE MAYESKY and HIPPOLYTE BOILEAU, both citizens of the French Republic, and residents of Paris, France, have invented certain new and useful Improvements in Shock-Deadeners, of which the following is a specification.

This invention relates to devices, which are provided on machines for the purpose of neutralizing the shocks arising from sudden changes of speed, and it relates more especially to shock deadeners of motor cars.

One of the objects of the improved device is to absorb violent shocks by means of friction.

Another object is to neutralize these shocks gradually.

A third object is not to enter into action, unless the shock exceeds a certain degree of violence.

The invention consists in certain novel features of construction, as hereafter shown and described, and specified in the claims.

In the drawing: Figure 1 shows the improved device, in front elevation with a partial section, attached to the running gear of a motor car. Fig. 2 is a sectional view on the lines A—A of Fig. 1.

$a$ designates a casing, mounted on the beam $b$ of the chassis of a vehicle. $c$, $c'$, $c^2$ designate annular flanges, preferably integral with the casing $a$ and preferably in concentric relation to each other. Circular blade springs $d$, $d'$, $d^2$ are provided in the annular spaces formed by the flanges. A leather lining $e$, $e'$, $e^2$ is interposed between each of the springs and the adjacent flange, each of said springs being preferably formed by a plurality of superposed blades, as indicated in the drawing. The free ends of the springs do not abut against each other but they are arranged, so that a gap is formed between the free ends of each spring and these gaps are of various widths. A member $f$ is movably, preferably pivotally connected with the casing $a$, the bolt $h$ forming the pivot in the embodiment shown in the drawing. A plurality of projecting members $i$, $i'$, $i^2$, extend from the covering member $f$, with which member they are preferably integral, into the gaps between the free ends of every spring. Arm $g$ extending from the member $f$ is pivotally connected with one end of the articulated link $j$, the other end of this link $j$ being in pivotal connection with the bracket $k$, provided near the ordinary carriage springs $l$ above the axle $m$ of the car.

If the car, on account of an unevenness of the road, receives a violent shock, the sudden movement of the axle $m$ is transferred to the shock absorbing device by means of the link $j$ and arm $g$. The covering member $f$ rigidly connected to the arm $g$ starts a rotary movement and the projecting members $i$, $i'$, $i^2$ abut against the respective ends of the circular springs, pressing them against the annular flange with more or less force, according to the suddenness and force of the shock.

As the gaps between the ends of the springs are of various widths, the projections $i$, $i'$, $i^2$ do not engage all of the springs at the same instant, but in successive instants; the friction between the leather lining and the circular flanges likewise increases gradually and hence a gradual absorption of the shock is obtained. In less violent shocks the abutments do not rotate far enough to engage their respective springs, and the ordinary carriage springs $l$ serve in well known way to neutralize the vibrations.

It will thus be seen that in the improved shock deadening device a gradual absorption of heavy shocks is obtained, that the shock absorbing device does not enter into action, unless the shocks exceed a certain degree of violence, and that the shock deadening device is of such construction as not to require control of any kind.

We claim:

1. In a device of the kind described the combination of a relatively stationary member secured to one of the relatively moving parts to be connected, a plurality of annular concentric flanges on the said member, a plurality of frictional members arranged adjacent to the said annular flanges and adapted to frictionally engage the latter, a relatively movable member adapted to angularly but concentrically move with reference to the relatively stationary member, means provided on said relatively movable member adapted to cause the said frictional members to move relatively to the coöperating frictional surface, and means for connecting the said relatively movable member with the other part to be connected so that the relative motions of that part with reference to the first part are transmitted to the said relatively movable part in the form of angular oscillations, substantially as and for the purpose set forth.

2. In a device of the kind described the combination with two parts the oscillations of which are to be deadened, of a relatively stationary member secured to one of said parts, a plurality of concentric annular flanges projecting at right angles from the said member, a plurality of split circular spring blades inserted between the said flanges and leaving a free space between their ends, these springs being adapted to frictionally engage the said flanges, a frictional leather covering on the frictional surface of said springs, a relatively movable member adapted to concentrically move with reference to the said relatively stationary member, a plurality of abutments on the said relatively movable member and adapted to project between the said free ends of the said frictional springs and means for connecting the said relatively movable member with the other oscillating part so as to receive motion from the latter, substantially as and for the purpose set forth.

3. In a device of the kind described the combination with two parts the oscillations of which are to be deadened, of a relatively stationary box secured to one of the said parts, a plurality of concentric annular flanges on said box, a plurality of split circular spring blades inserted between the said flanges and leaving between their free ends a free space increasing from one spring to the other, these springs being adapted to frictionally engage the said flanges, a leather covering secured to the frictional side of each spring, a cover rotatably held on the said box, a plurality of abutments secured to the said cover and projecting each between the free ends of the said springs and adapted to successively engage them, a certain lost motion being provided between the first abutment and the corresponding spring ends, and means for connecting the said cover with the other oscillating part, so as to transmit the motion of the latter to the said cover, substantially as and for the purpose set forth.

4. In a device of the kind described the combination with two parts the oscillations whereof are to be deadened of a relatively stationary box secured to one of these parts, a plurality of concentric annular flanges in said box, a plurality of split circular spring blades inserted between the said flanges and leaving between their free ends free spaces, these springs being each composed of a plurality of superposed blades, and adapted to frictionally engage the said flanges, a cover for said box, a central bolt adapted to rotatably hold the said cover on said box, a plurality of abutments secured to the said cover and projecting into the free spaces between the said spring ends, and means for connecting the said cover with the other oscillating part, so as to transmit the motion of the latter to the said cover, substantially as and for the purpose set forth.

5. In a shock deadener for motor cars the combination with the frame work and the axle of the car, of a box secured to the frame work of the car, a plurality of concentric flanges on the said box, a plurality of circular split spring blades frictionally engaged with said flanges and leaving free spaces between their ends, a cover for said box, means for rotatably holding this cover on said box, a plurality of abutments on said cover and freely projecting into the spaces between the said spring ends, a substantially horizontal arm on said cover, an angle piece secured to the said axle of the car and a connecting rod pivotally connected at one end with the free end of said arm and at the other with the said angle piece, substantially as and for the purpose set forth.

6. In a shock deadener for motor cars the combination with the framework and the axle of the car, of a box secured to the said framework, a plurality of circular concentric flanges in said box, a plurality of concentric split springs frictionally engaged with said flanges and having gaps between their free ends, a cover rotatably held on said box, a plurality of abutments on said cover and engaging the gaps of said springs, an arm provided on said cover and projecting substantially horizontally therefrom, an angle piece secured to said axle of the car, a connecting rod between the free end of said arm and the said angle piece and means connecting the ends of the said connecting rod respectively with the free end of said arm and said angle piece, substantially as and for the purpose set forth.

In testimony whereof we have hereunto set our hands in presence of two witnesses.

ALEXANDRE MAYESKY,
HIPPOLYTE BOILEAU.

Witnesses:
 JOHN BAKER,
 H. C. COXE.